US00RE38661E

(19) United States
(12) Reissued Patent
Tachiuchi et al.

(10) Patent Number: US RE38,661 E
(45) Date of Reissued Patent: Nov. 30, 2004

(54) METHOD AND APPARATUS FOR LIQUID CRYSTAL DISPLAY WITH INTERMEDIATE TONE

(75) Inventors: Tsuguji Tachiuchi, Odawara (JP); Hiroyuki Mano, Kawasaki (JP); Terumi Takashi, Yokohama (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/929,092

(22) Filed: Sep. 15, 1997

Related U.S. Patent Documents

Reissue of:
(64) Patent No.: 4,808,991
Issued: Feb. 28, 1989
Appl. No.: 07/002,198
Filed: Jan. 12, 1987

(63) Continuation of application No. 07/650,763, filed on Feb. 5, 1991, now abandoned.

(30) Foreign Application Priority Data

Jan. 13, 1986 (JP) ..... 61-3621

(51) Int. Cl.[7] ..... G09G 3/36
(52) U.S. Cl. ..... 345/89; 348/792
(58) Field of Search ..... 340/793, 784, 340/735, 790; 358/236, 241; 350/332, 333; 345/89, 147, 148, 149, 694, 696; 348/792

(56) References Cited

U.S. PATENT DOCUMENTS

| | | | | |
|---|---|---|---|---|
| 3,590,156 A | * | 6/1971 | Easton | 358/241 |
| 3,997,719 A | * | 12/1976 | Judice | 340/793 |
| 4,180,813 A | * | 12/1979 | Yoneda | 340/793 |
| 4,427,978 A | * | 1/1984 | Williams | 340/793 |
| 4,427,979 A | * | 1/1984 | Clerc et al. | 340/793 |
| 4,531,160 A | * | 7/1985 | Ehn | 340/793 |
| 4,706,077 A | * | 11/1987 | Roberts et al. | 340/793 |
| 4,709,995 A | * | 12/1987 | Kuribayashi et al. | 350/350 S |

OTHER PUBLICATIONS

Publication on Yamaha product Model V6355D, Sep. 1985.

* cited by examiner

*Primary Examiner*—Jeffery Brier
(74) *Attorney, Agent, or Firm*—Antonelli, Terry, Stout & Kraus, LLP

(57) ABSTRACT

A liquid crystal display is capable of displaying intermediate, partial or half tones of images, while at the same time preventing the occurrence of flicker and the decay of the liquid crystal panel. The display operation for data to be displayed in an intermediate tone has one or more lines of a repeating frame of display data that are prohibited from being displayed during in each frame. Such inhibited display lines are designated differently on a sequential basis over consecutive frames, and the sequence of designation is varied in successive frames in accord with changing patterns.

7 Claims, 7 Drawing Sheets

| FRAM NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| ALTERNATING SIGNAL | + | − | + | − | + | − | + | − | + | − | + | − | + | − | + | − |
| POLARITY APPLIED TO LIQUID CRYSTAL | ±0 | − | + | − | + | − | + | ±0 | + | − | ±0 | − | + | ±0 | + | − |
| AVERAGE APPLICATION VOLTAGE | ± 0 | | | | | | | | | | | | | | | |

FIG. 8A PRIOR ART
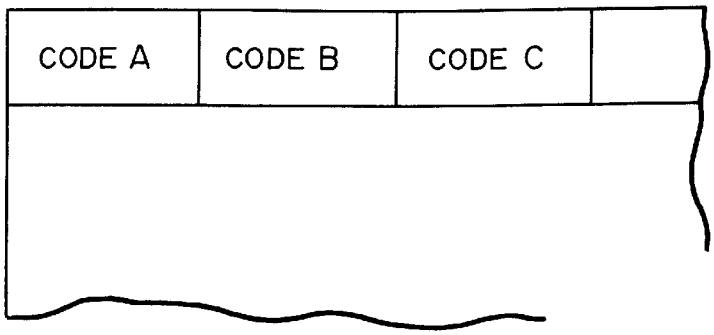
FIG. 8B PRIOR ART
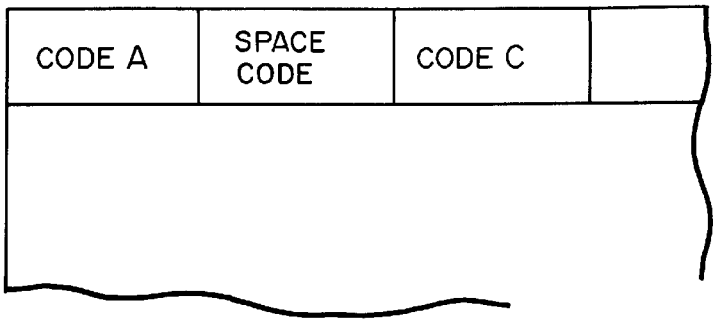
FIG. 10 PRIOR ART
| FRAM NUMBER | 1 | 2 | 3 | 4 | 5 | 6 |
|---|---|---|---|---|---|---|
| ALTERNATING SIGNAL | + | − | + | − | + | − |
| POLARITY APPLIED TO LIQUID CRYSTAL | + | ±0 | + | ±0 | + | ±0 |
| AVERAGE APPLICATION VOLTAGE | + | | | | | |

METHOD AND APPARATUS FOR LIQUID CRYSTAL DISPLAY WITH INTERMEDIATE TONE

Matter enclosed in heavy brackets [ ] appears in the original patent but forms no part of this reissue specification; matter printed in italics indicates the additions made by reissue.

*This application is a continuation application of Ser. No. 07/650,763, filed Feb. 5, 1991, which is a reissue application of Ser. No. 07/002,198, filed Jan. 12, 1987, now U.S. Pat. No. 4,808,991, granted Feb. 28, 1989.*

BACKGROUND OF THE INVENTION

This invention relates to a method and an apparatus for liquid crystal display capable of displaying intermediate tones partial tones or half tones of images.

A known method for displaying an intermediate tone that is less than a normal or full tone of an image on a liquid crystal display panel employs a fast blinking operation as disclosed, for example, in JP-A-58-57192. This conventional technique will first be described using FIGS. 7 through 10.

FIG. 7 shows in block diagram the conventional liquid crystal display apparatus, which includes a display address generating circuit 1, memories 2 and 3, a switching signal generating circuit 4, a memory switching circuit 5, a display data forming circuit 6, and a liquid crystal display panel 7.

In the arrangement, a display address 8 issued by the display address generating circuit 1 is received by the memory 2 and memory 3 simultaneously, and the memories 2 and 3 read out character codes. The switching signal generating circuit 4 provides a switching signal to the memory switching circuit 5, and when the signal is "high", a character code read out of the memory 2 is fed to the display data forming circuit 6 by way of the memory switching circuit 5, while when the switching signal is "low", a character code read out of the memory 3 is fed through the memory switching circuit 5 to the display data forming circuit 6. The switching signal alternates its binary levels in every display period for consecutive frames on the liquid crystal display panel 7, so that when the memory 2 is selected by the memory switching circuit 5 to supply its contents to the display data forming circuit 6 at the time of displaying the first frame, the memory 3 is selected next at the time of displaying the second frame. The display data forming circuit 6 forms a supplied character code into a character pattern and delivers it as a display data 9 to the liquid crystal panel 7.

Supposing characters "A", "B" and "C" are displayed on the liquid crystal panel 7 with the character "B" being displayed in an intermediate tone, the memory 2 stores codes A, B and C representing characters "A", "B" and "C", whereas the memory 3 stores only character codes A and C. On this account, when the memory switching circuit 5 selects the memories 2 and 3 alternately, the characters "A", "B" and "C" are displayed in the first frame as shown in FIG. 9A, while only characters "A" and "C" are displayed in the second frame as shown in FIG. 9B. Accordingly, the characters "A" and "C" are displayed in every frame, while the character "B" is displayed in every two frame, resulting in an intermediate tone for the character "B" as shown in FIG. 9C. However, when the display apparatus operates at a typical frame frequency of 60 Hz, the character "B" appears iteratively at 30 Hz, which causes a pronounced flicker as a result of the intermediate tone display.

Application of a d.c. voltage to liquid crystal brings on electrolysis, which impairs the operating life of the device. Therefore, an alternating display data signal must be supplied to the liquid crystal panel so as to avoid a defect caused by d.c. voltage application. For this reason, the liquid crystal panel 7 is given an alternating signal so that the display data signal has alternate polarities for consecutive frames, although this aspect is not shown in FIG. 7. Namely, the first, third and fifth frames have display data signals with a positive polarity, while the second, fourth and sixth frames have display signals with a negative polarity, as shown in FIG. 10.

In the prior art liquid crystal display apparatus producing an intermediate tone, as illustrated in FIG. 7, no display data signal is supplied in even-numbered frames to the display area where the character "B" is to be displayed in an intermediate tone, and the display data signals for these frames have polarities of "+", "±0", "+", "±0", "+", and so on as shown in FIG. 10. This portion of the liquid crystal panel is applied with the voltage signal only in odd-numbered frames with a positive polarity invariably, and this means the application of a d.c. voltage to liquid crystal due to the integration effect, resulting in an impaired service life of the liquid crystal display panel.

SUMMARY OF THE INVENTION

An object of this invention is to overcome the foregoing prior art problem and provide a method and an apparatus for liquid crystal display capable of displaying intermediate tones of images while preventing the occurrence of flicker and impairment of characteristics of the liquid crystal panel.

In accordance with this invention, an intermediate tone or half tone of an image may be displayed by cancelling one or more lines of each frame through generation of a prohibit signal. The prohibited line of the frame is shifted in consecutive frames, and the order or sequence of shift is varied over a group of frames. This operational scheme provides an intermediate tone of image depending on the number of times of display for display data on each line without a significant flicker of display and without the application of a d.c. voltage to the liquid crystal panel.

BRIEF DESCRIPTION OF THE DRAWINGS

FIGS. 8A and 8B are diagrams showing the contents of the memories in the arrangement of FIG. 7;

FIG. 10 is a table explaining the polarity of the liquid crystal application voltage produced by the arrangement shown in FIG. 7.

DESCRIPTION OF THE PREFERRED EMBODIMENT

Figure 1:
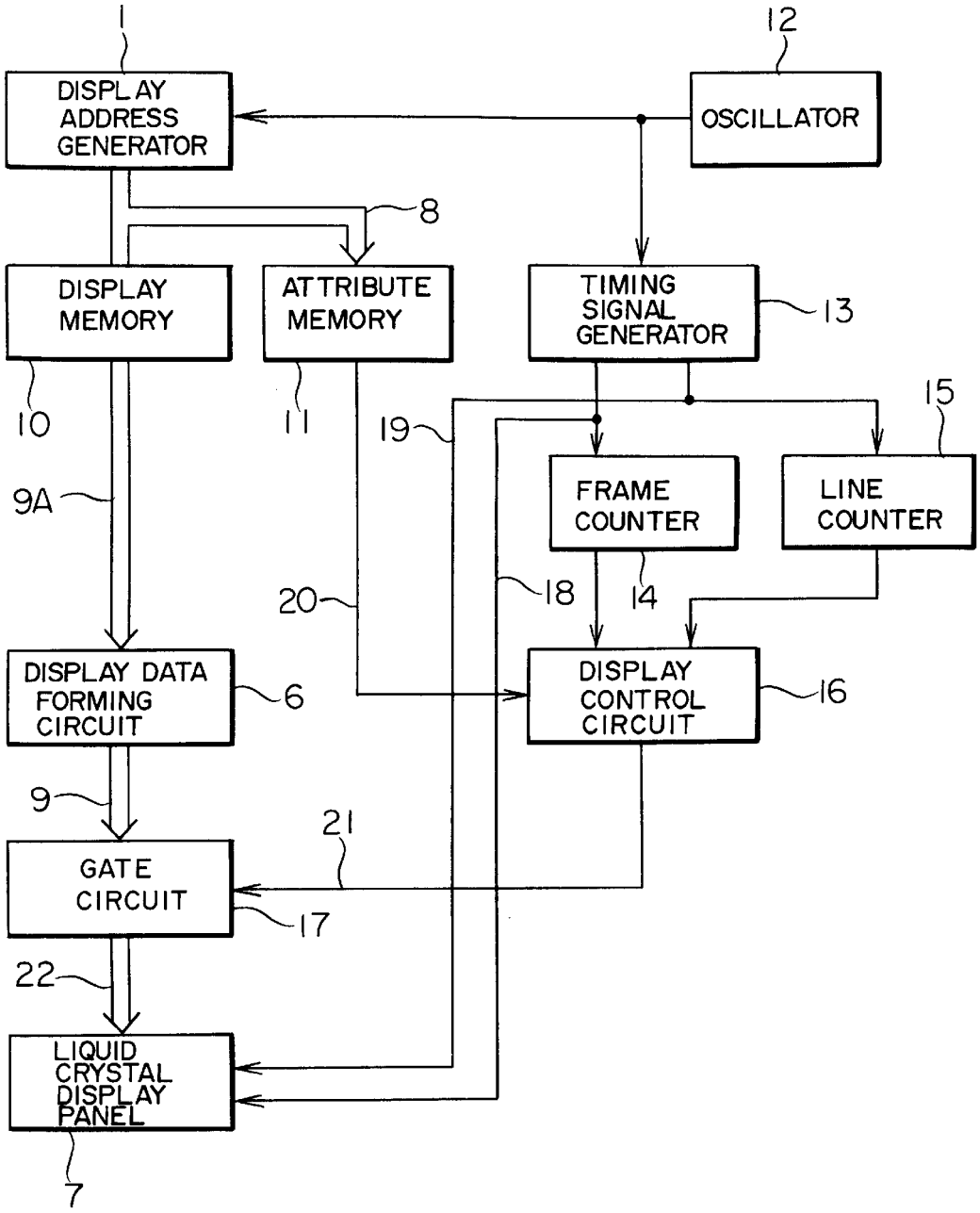
FIG. 1 is a block diagram showing the liquid crystal display apparatus embodying the present invention.

An embodiment of this invention will now be described with reference to the drawings. FIG. 1 shows in block diagram an embodiment of the inventive liquid crystal display apparatus, which includes a display memory 10, an attribute memory 11, an oscillator 12, a timing signal generating circuit 13, a frame counter 14, a line counter 15, a display control circuit 16, a gate circuit 17, and other functional blocks equivalent to those shown in FIG. 7 as referred to by the common symbols.

In the arrangement of FIG. 1, the display memory 10 stores codes of characters to be displayed, while the attribute memory 11 stores data indicative of whether each character stored in the display memory 10 is to be displayed in an intermediate tone. The display address generating circuit 1 produces a display address 8 in synchronism with the clock provided by the oscillator 12, and it is fed to the display memory 10 and attribute memory 11. The display memory 10 responds to the display address 8 to read out a character code 9A to the display data forming circuit 6, which forms a display data 9 representing a character pattern of the character to be displayed. The attribute memory 11 reads out an attribute signal 20 indicating whether the display data 9 produced by the display data forming circuit 6 is to be displayed in an intermediate tone. The attribute signal 20 has a "high" level for a character to be displayed in intermediate tone and has a "low" level for a character to be displayed in normal fashion.

The timing signal generating circuit 13 responds to the clock from the oscillator 12 to produce a frame pulse signal 18 indicative of the beginning of a frame and a line pulse signal 19 indicative of the beginning of a line. Assuming the number of lines of a frame on the liquid crystal panel 7 to be 200, for example, the timing signal generating circuit 13 produces a frame pulse signal 18 at every 200 line pulse signals 19. The frame pulse signal 18 and line pulse signal 19 are supplied to the liquid crystal panel 7 so as to establish the synchronism of display, and at the same time these signals 18 and 19 are fed to the frame counter 14 and line counter 15, respectively.

Count values of the frame counter 14 and line counter 15 are fed to the display control circuit 16, which specifies a line number dependent on the count value in response to a rise of the attribute signal 20 from the attribute memory 11, and produces a display inhibit signal 21 at a timing of output of the display data forming circuit 6 of display data 9 for a character to be displayed in intermediate tone with this line number. The display inhibit signal 21 has a "low" level causing the gate circuit 17 to be disabled so that the display data 9 for the specified line is not delivered to the liquid crystal panel 7. Each frame has a different line of display data 9 blocked by the gate circuit 17, and therefore the specified character is displayed in intermediate toner.

Figure 2:
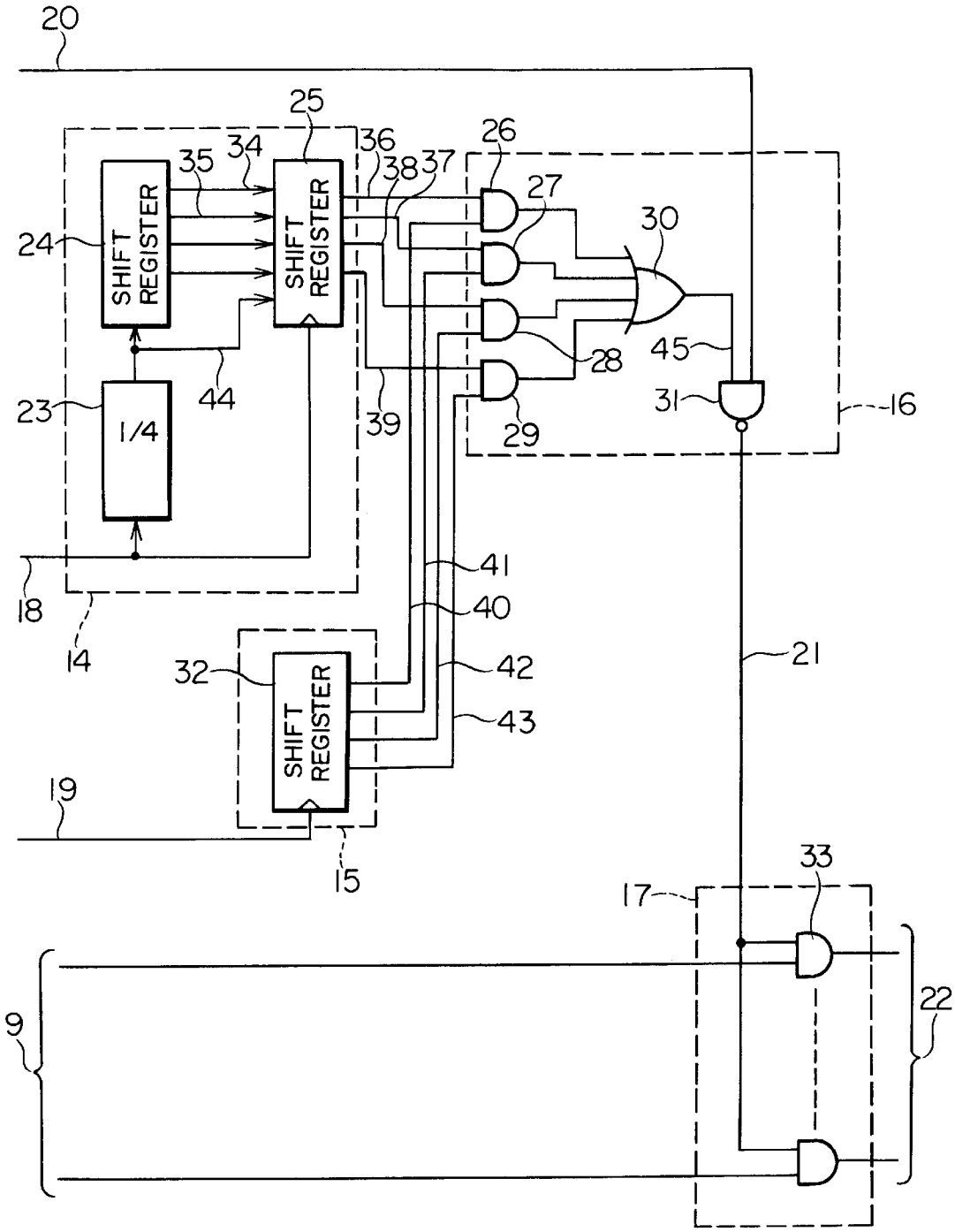
FIG. 2 is a block diagram showing a specific arrangement of the principal portion of the apparatus shown in FIG. 1.

FIG. 2 shows a specific circuit arrangement of the frame counter 14, line counter 15, display control circuit 16 and gate circuit 17 shown in FIG. 1. The arrangement includes a ¼ frequency division circuit 23, a shift register 24 used for setting, a shift register 25 used for frame control, logical AND gates 26–29, a logical OR gate 30, a logical NAND gate 31, a shift register 32 used for line control, and a set of AND gates 33. Circuit portions corresponding to those in FIG. 1 are given the common symbols.

The operation of the above circuit arrangement will be described using [FIG. 3] *FIGS. 3A–3C* with the assumption that a character consists of eight lines, the display data forming circuit 6 produces 8-bit display data 9, and the shift registers 24, 25 and 32 have each a 4-bit arrangement. However, the numbers of bits, such as eight bits and four bits, have nothing to do with the following explanation.

Figure 3A:
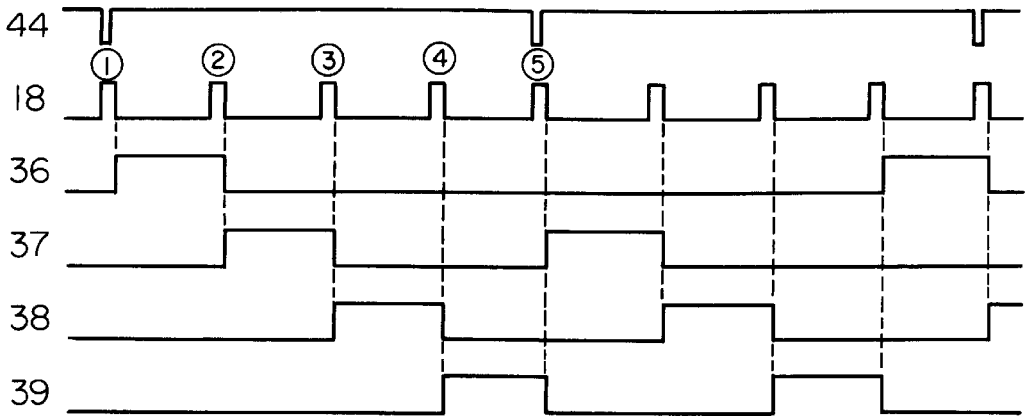
FIGS. 3A, 3B and 3C are timing charts used to explain the operation of the arrangement shown in FIG. 2.

It is assumed that the ¼ frequency division circuit 23 has received a frame pulse 18 at ① and produces a clock pulse 44 as shown in FIG. 3A. By this clock pulse, the frame control shift register 25 is initialized by being supplied with the contents of the initial setting shift register 24. The shift register 25 is assumed to be initialized with its output 36 providing a "high" level and outputs 37–39 providing a "low" level. The initial setting shift register 24 has had a "high" output 34 and other "low" outputs, but after initialization of the frame control shift register 25 it is shifted by one bit by the clock pulse 44 to have its output 34 reversing to "low", output 35 reversing to "high" and other outputs remaining a "low" level preparing for the next initialization. The frame control shift register 25 has its outputs 36–39 unchanged until the entry of the next frame pulse signal 18.

Figure 3B:
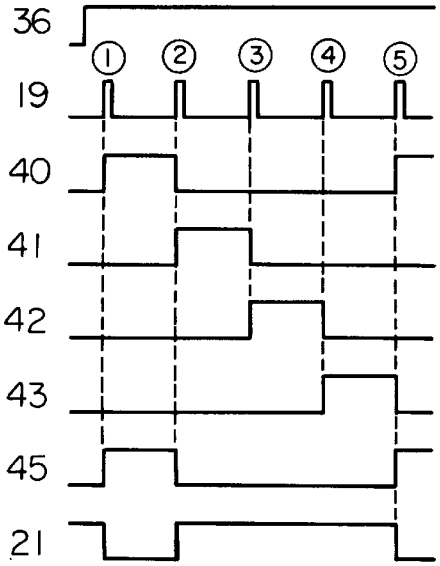

After the frame control shift register 25 has been initialized in response to the frame pulse signal 18 at 1, a line pulse signal 19 at ① comes in to cause the line control shift register 32 to provide a "high" output 40 and "low" outputs 41–43, for example, as shown in FIG. 3B, which, together with the "high" output 36 and "low" outputs 37–39 of the frame control shift register 25, causes the display control circuit 16 to have only "high" output on the logical AND gate 26 and then have a "high" signal 45 at the output of the logical OR gate 30. The line control shift register 32 makes a cycle of a "high" output iteratively upon receiving four line pulse signals 19, causing the logical AND gate 26 to produce a "high" output and then the logical OR gate 30 to produce a "high" output signal 45 at each entry of the first, fifth, or generally the 1+4N th (N=0, 1, 2, . . . ) line pulse signals 19.

Assuming that the attribute memory 11 (FIG. 1) is providing a "high" attribute signal 20 with the intention of an intermediate tone display, the logical NAND gate 31 produces a display inhibit signal 21 (a "low" level signal) in each display period for the first, fifth, or generally the 1+4N th (N=0, 1, 2, . . . ) lines of the first frame. Consequently, the display data 9 to the liquid crystal panel 7 is blocked by the logical AND gates 33 in the gate circuit 17, and therefore the first and fifth lines of a character pattern "A" are kept blank in the first frame.

Next, when a frame pulse signal 18 at ② has entered the frame counter 14, the frame control shift register 25 shifts its contents by one bit, providing a "high" output 37 and "low" outputs 36, 38 and 39, as shown in FIG. 3A. In this state, when a line control pulse signal 19 at ① comes in, the line control shift register 32 produces a "high" output 40 and "low" outputs 41–43. Consequently, the display control circuit 16 has "low" signals at the output of the logical AND gates 26–29, as shown in FIG. 3C.

Figure 4A:
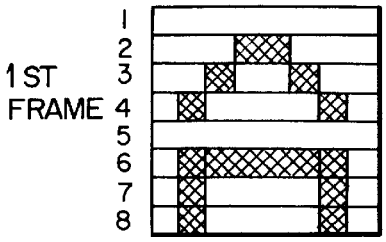
FIGS. 4A through [4B] *4E* and FIGS. 5A through 5E are diagrams explaining the intermediate tone display on the liquid crystal display panel.
Figure 4B:
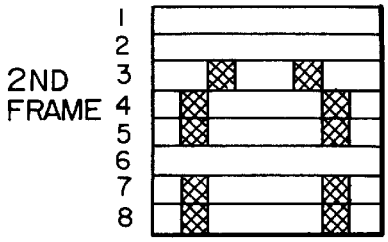

At entry of the next line pulse signal 19 at ②, the line control shift register 32 has its output 41 becoming "high" and outputs 40, 42 and 43 becoming "low", causing the display control circuit 16 to have a "high" signal at the output of the logical AND gate 27 and then a "high" output 45 on the logical OR gate 30. Since the line control shift register 32 rotates a "high" output around its output 40–43 by receiving by four line pulse signals 19, the logical OR gate 30 produces a "high" output 45 at the second, sixth, or generally the 2+4N th (N=0, 1, 2, . . . ) lines. At this time, the attribute memory 11 is providing a "high" attribute signal 20 with the intention of intermediate tone display, and therefore the logical NAND gate 31 produces a display inhibit signal 21 (a "low" level signal) in each display period for the second, sixth, or generally the 2+4N th (N=0, 1, 2, . . . ) lines of the second frame. Consequently, the second and sixth lines of the character pattern "A" are kept blank in the second frame as shown in FIG. 4B. It should be noted that the first line is not involved inherently for displaying the character "A".

Figure 4C:
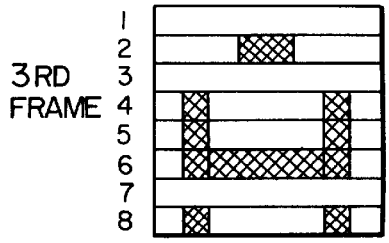
Figure 4D:
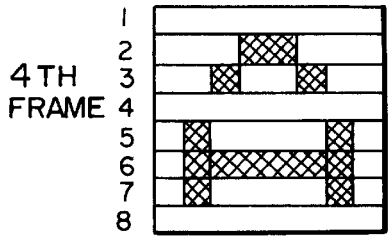

In the same manner, when the frame pulse signal 18 at ③ or ④ has entered the frame counter 14 as shown in FIG. 3A, the third and seventh lines are kept blank in the third frame as shown in FIG. 4C, or the fourth and eighth lines are kept blank in the fourth frame as shown in FIG. 4D.

Figure 4E:
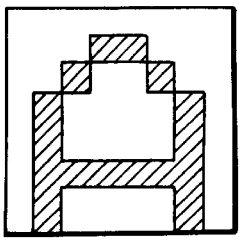

Accordingly, by scattering blank lines over frames, the character "A" appears in an intermediate tone on the display panel as shown in FIG. 4E, and in this case flicker is less noticeable because only part of a character pattern is disactivated.

These are the case of 4-frame period, i.e., a character is divisionally eliminated from display in a length of four frames. Next, when a frame pulse signal 18 at ⑤ has entered the frame counter 14, the ¼ frequency division circuit 23 produces a clock pulse 44 as shown in FIG. 3A, causing the initial setting shift register 24 to transfer its contents to the frame control shift register 25, and consequently it is initialized to have a "high" output 37 and "low" outputs 36, 38 and 39. This clock pulse 44 operates on the initial setting shift register 24 to advance by one bit for the subsequent initializing operation.

Figure 3C:
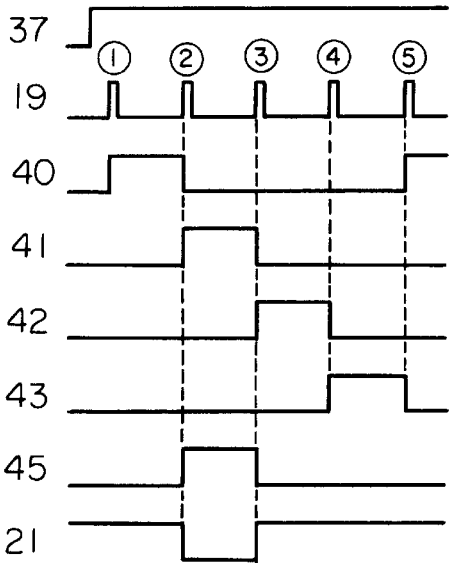
Figure 5A:
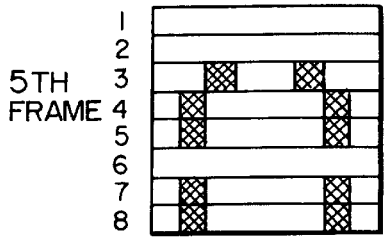
Figure 5B:
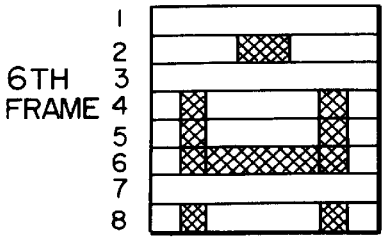
Figure 5C:
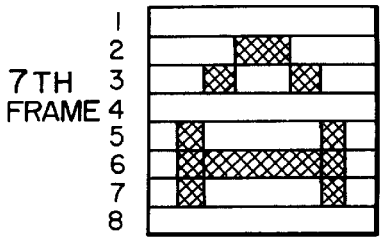
Figure 5D:
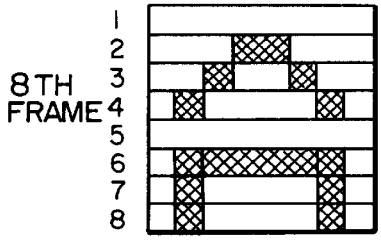
Figure 5E:
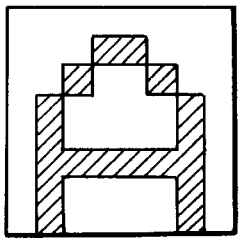

The remaining operation of the line control shift register 32 for the fifth frame is exactly identical to the previous case, and the line control shift register 32 produces a "high" output 40 in response to the line pulse signal 19 to ① and produces a "high" output 41 in response to the line pulse signal 19 at ②, as shown in FIG. 3C. Accordingly, with the output of the line control shift register 32 becoming "high" for the second, sixth, or generally the 2+4N th (N=0, 1, 2, . . . ) lines of the fifth frame, the display control circuit 16 provides the display inhibit signal 21 (a "low" level signal) as in the previous case. Consequently, the second and sixth lines of the character "A" are kept blank in the fifth frame, as shown in FIG. 5A. In the same manner, the third and seventh lines are blank in the sixth frame (FIG. 5B), the fourth and eighth lines are blank in the seventh frame (FIG. 5C), and the first and fifth lines are blank in the eighth frame (FIG. 5D), resulting in an intermediate tone display for the character "A" as shown in FIG. 5E. It is not necessary for the ninth, tenth, 11th and 12th frames to have blanking on their third and seventh lines, the fourth and eighth lines, the first and fifth lines, and the second and sixth lines, respectively, but instead blank lines may preferably be set irregularly such as the first and eighth lines, the second and fifth lines, the third and sixth lines, and the fourth and seventh lines, respectively, so that flicker is alleviated more effectively.

As described above, by changing the correspondence between the line numbers of blank lines and the frame number at every fourth frame sequentially, the character "A" can be displayed in an intermediate tone.

Figures 6, 7:
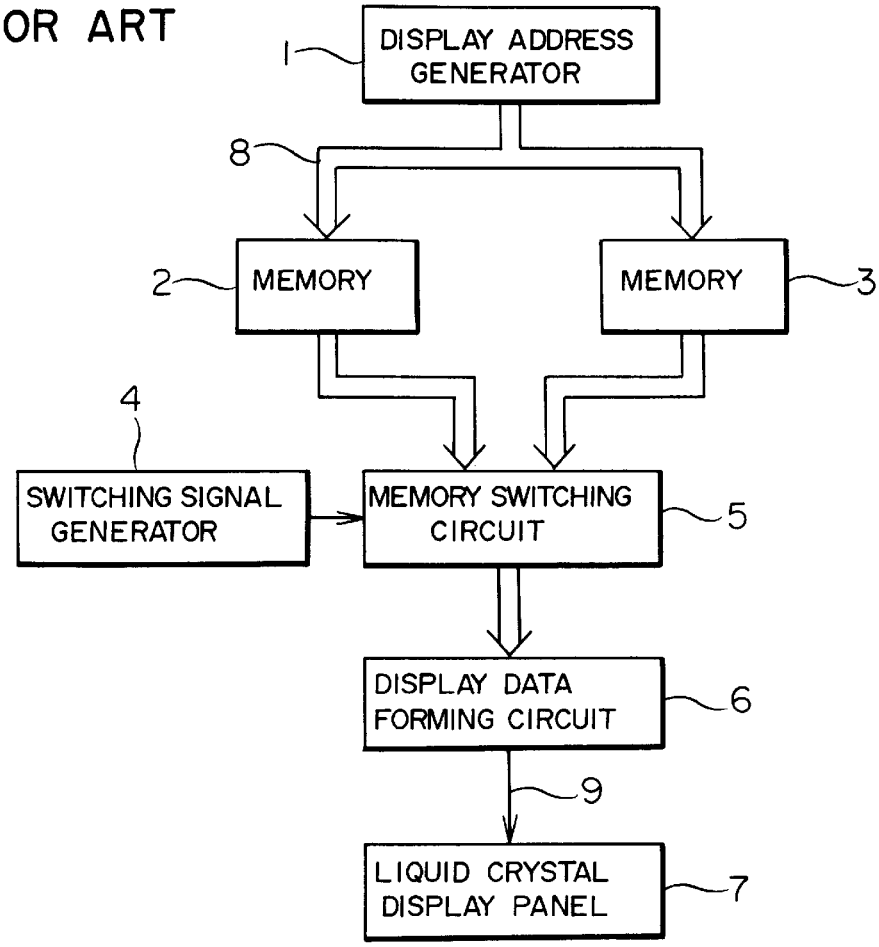
FIG. 7 PRIOR ART
FIG. 6 is a table showing the polarity of the application voltage to the liquid crystal panel shown in FIG. 1.
FIG. 7 is a block diagram showing a conventional liquid crystal display apparatus.
Figure 9A:
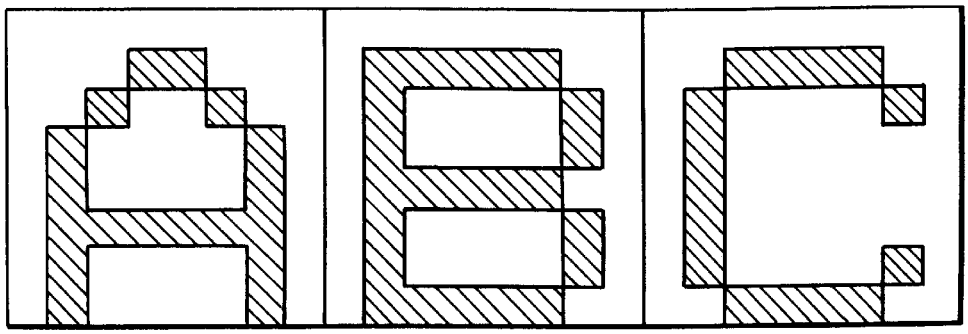
FIG. 9A PRIOR ART
FIGS. 9A, 9B and 9C are diagrams used to explain the intermediate tone display implemented by the conventional apparatus shown in FIG. 7.
Figure 9B:
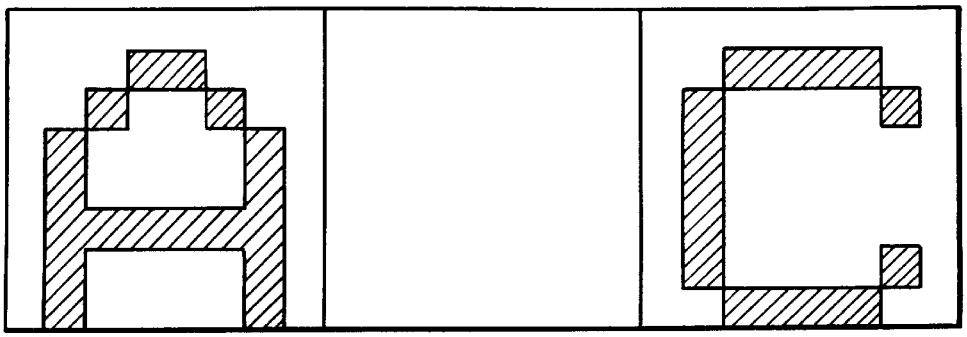
FIG. 9B PRIOR ART
Figure 9C:
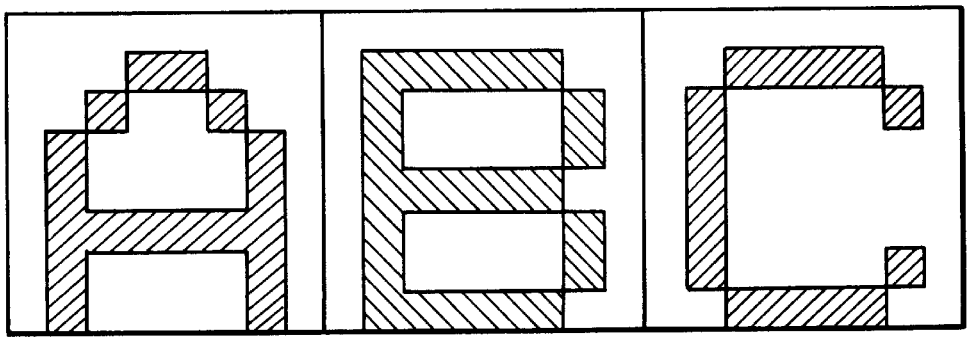
FIG. 9C PRIOR ART

The following describes using FIG. 6 the fact that a d.c. voltage component is not applied to the liquid crystal panel, as opposed to the prior art liquid crystal display apparatus as shown in FIG. 7. The explanation is focused on the operation of a specific line (the fifth line).

The alternating signal is applied to the liquid crystal panel so that consecutive frames have a positive and negative polarities alternately, as in the conventional technique. The first frame has a positive signal, but this line is made blank by the gate circuit 17 (FIG. 1) and neither positive or negative voltage is applied to the liquid crystal panel 7. In the second frame, the signal reverses to negative, enabling the gate circuit 17 to display the line, and a display data signal with a negative polarity is applied to the liquid crystal panel 7. In the same way, the polarity of signal applied to liquid crystal is determined successively. FIG. 6 shows the case in which the ninth through 16th frames have blank display lines on the third and seventh lines, the fourth and eighth lines, the first and fifth lines, the second and sixth lines, the fourth and eighth lines, the first and fifth lines, the second and sixth lines, and the third and seventh lines, respectively. Accordingly, the liquid crystal panel 7 is applied with display data signals having polarities of "+", "−" and "±0". Although the polarity shift cycle is two frames, as shown in FIG. 6, the appearance of blanking frame is not periodical. In other words, the display inhibit signal for prohibiting a display data from appearing on the liquid crystal panel is produced at intervals different from a common multiple with the alternating period of the application voltage. Nonetheless, as will be appreciated from the figure, one frame out of four is certainly given the polarity "±0". On this account, voltages applied to liquid crystal are averaged out to zero, and no d.c. voltage component is applied to the liquid crystal panel 7.

The foregoing embodiment implements intermediate tone display by making a specific line blank once in four frames. The present invention is not confined to this scheme, but instead it is possible to have intermediate tone display in different contrast than the above embodiment by changing the operating condition in such a way that a display line is made blank twice in four frames, or once in five frames. Accordingly through the provision of several blanking frame rates and by combining these operating conditions, display in several intermediate tones is made possible. This can be achieved, for example, by defining a first tone to be done by blanking a line once in four frames, a second tone to be done by blanking a line once in five frames, a third tone to be done by blanking a line twice in four frames, and so on, and by selecting a tone control in response to the output of the attribute memory 11.

According to this invention, as described above, intermediate tone display with less noticeable flicker is achieved, the liquid crystal panel is prevented from d.c. voltage application so that it retains the performance and life, and several intermediate tones of display can be produced selectively.

We claim:

1. In a method for displaying a display pattern by use of a liquid crystal display panel wherein the display pattern includes a character or figure in an intermediate tone and is composed of a plurality of parallel display lines forming a frame and there being a plurality of frames produced on a sequential basis, said method comprising the steps of:

(a) producing a display address;

(b) producing display data of said display pattern for each display line in response to said display address;

(c) producing a display inhibit signal for intermittently prohibiting said display data from being displayed on said liquid crystal display panel at an interval different from a multiple of a period of an alternating voltage applied to said liquid crystal panel in response to information relating to an attribute of said display pattern;

(d) said display inhibit signal being produced such that the display lines on which said display data is prohibited from being displayed on said liquid crystal display panel during one frame are different than the display lines on which said display data is prohibited from being displayed on said liquid crystal display when a succeeding frame is displayed; and (e) displaying said display data on said liquid crystal display panel when said display inhibit signal is absent, or preventing said display data from being displayed on said liquid crystal display panel when said display inhibit signal is present.

2. In a method for displaying a display pattern by use of a liquid crystal display panel wherein the display pattern includes a character or figure in an intermediate tone and is composed of a plurality of parallel display lines forming a frame and there being a plurality of frames produced on a sequential basis, said method comprising the steps of:

(a) producing a display address;

(b) producing display data of said display pattern for each display line in response to said display address;

(c) producing a display inhibit signal for intermittently prohibiting said display data from being displayed on said liquid crystal display panel at an interval different from a multiple of a period of an alternating voltage applied to said liquid crystal panel in response to information relating to an attribute of said display pattern;

(d) said display inhibit signal being effective simultaneously on a plurality of said display lines in a particular frame in which said display data is prohibited from being displayed on said liquid crystal display panel, the particular ones of said last mentioned display lines being different from succeeding frames according to an order and the order is different for a predetermined number of frames; and (e) displaying said display data on said liquid crystal display panel when said display inhibit signal is absent, or preventing said display data from being displayed on said liquid crystal display panel when said display inhibit signal is present.

3. In a method for displaying a display pattern by use of a liquid crystal display panel wherein the display pattern includes a character of figure in an intermediate tone and is composed of a plurality of parallel display lines forming a frame, said method comprising the steps of:

(a) producing a display address;

(b) producing display data of said display pattern for each display line in response to said display address;

(c) producing a display inhibit signal for intermittently prohibiting said display data from being displayed on said liquid crystal display panel at an interval different from a multiple of a period of an alternating voltage applied to said liquid crystal panel in response to information relating to an attribute of said display pattern;

(d) said display inhibit signal being produced in association with a display line of a frame composed of a plurality of display lines in which said display data is displayed on said liquid crystal display panel and the display line in which said display data is prohibited from being displayed on said liquid crystal display panel has a different position in the frame in successive frames; and (e) displaying said display data on said liquid crystal display panel when said display inhibit signal is absent, or preventing said display data from being displayed on said liquid crystal display panel when said display inhibit signal is present.

4. A liquid crystal display apparatus comprising:

display addressing means for producing a sequential display address signal;

memory means for storing display data signals corresponding to a character or figure pattern to be displayed in each of a plurality of sequentially produced frames and for providing said display data signal for each display line of a multiline frame in response to reception of said display address signal;

an attribute memory for producing an attribute signal indicative of an intermediate tone display for said display pattern that is less than a normal tone display;

liquid crystal display means which periodically receives said display data signals and displays said pattern visually; and control means which responds to said attribute signal to produce a display inhibit signal for prohibiting said display data from being displayed on said liquid crystal display means at a first predetermined display line during one frame and at other predetermined display lines on a sequential basis over consecutive frame.

5. A liquid crystal display apparatus according to claim 4, wherein said control means comprises means for generating frame pulse signals corresponding to each frame displayed by said liquid crystal display means, means for generating line pulse signals corresponding to each display line of a frame displayed by said liquid crystal display means, and display control means responsive to said attribute signal to produce a display inhibit signal within a display period for said display pattern depending on a predetermined combination of count values of said frame pulse signals and of said line counter pulse signals.

6. A liquid crystal display apparatus comprising:

display addressing means for producing a sequential display address signal;

memory means which stores display data signals corresponding to a character or figure pattern to be displayed in each of a plurality of sequentially produced frames and provides said display data signals for each display line in response to reception of said display address signals;

an attribute memory for producing an attribute signal indicative of an intermediate tone display for said display pattern;

liquid crystal display means connected to receive said display data signals for displaying said pattern visually;

control means responsive to said attribute signal to produce a display inhibit signal; and gate means responsive to said display inhibit signal to prevent a display data signal from being delivered to said liquid crystal display means so that [portions] *lines* of said display pattern are sequentially blocked on an intermittent basis in preselected frames in accordance with said attribute signal to thereby produce a display in an intermediate tone that is less than a normal full tone.

7. A liquid crystal display apparatus according to claim 6, wherein said control means comprises means for generating frame pulse signals corresponding to each frame displayed by said liquid crystal display means, means for generating line pulse signals corresponding to each display line of a frame displayed by said liquid crystal display means, and display control means responsive to said attribute signal to produce said display inhibit signal within a display period for said display pattern depending on a predetermined combination of count values of said frame pulse signals and of said line counter pulse signals.

* * * * *